INVENTORS.
HARRY E. MILLER.
BENJAMIN A. METZGER.

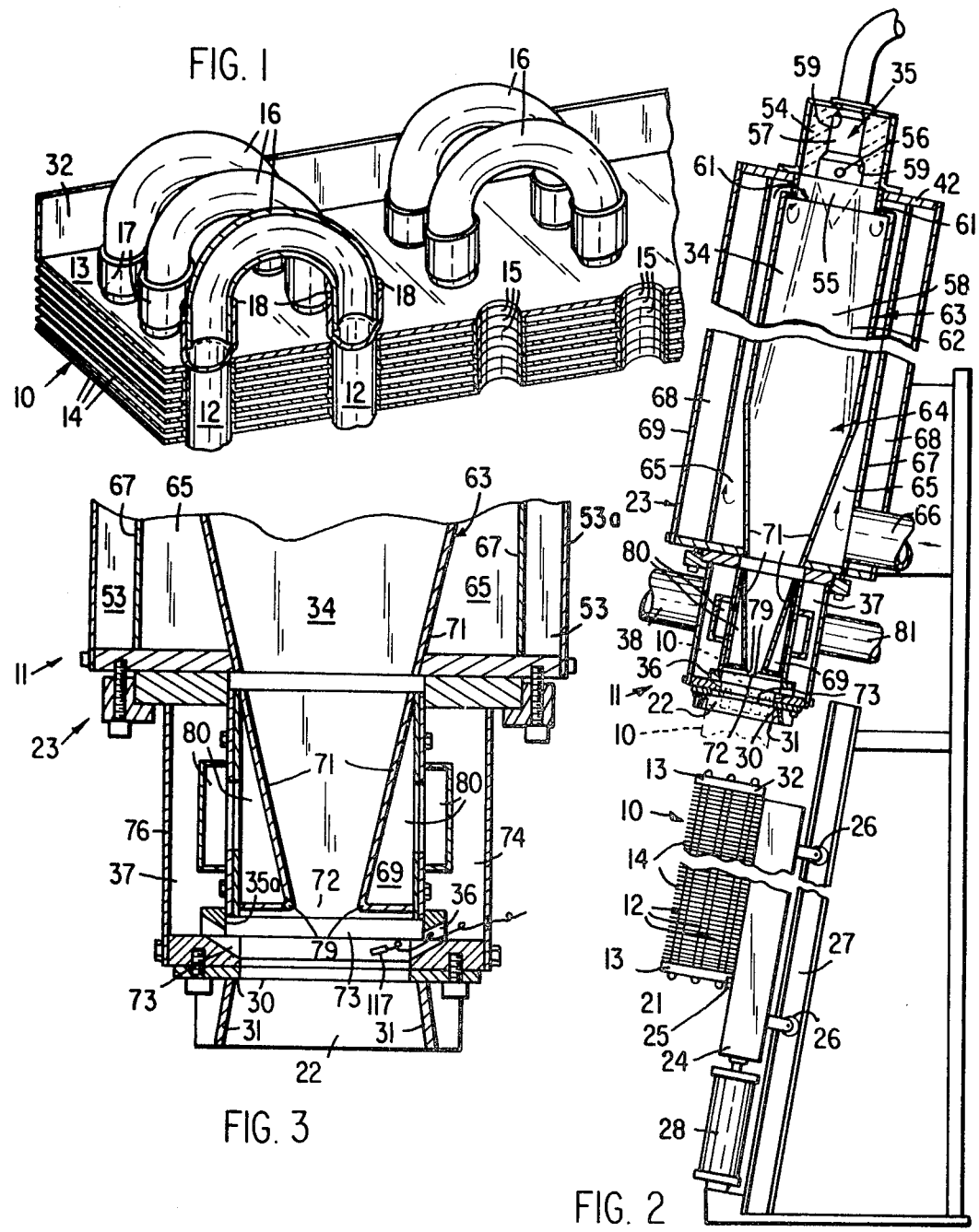

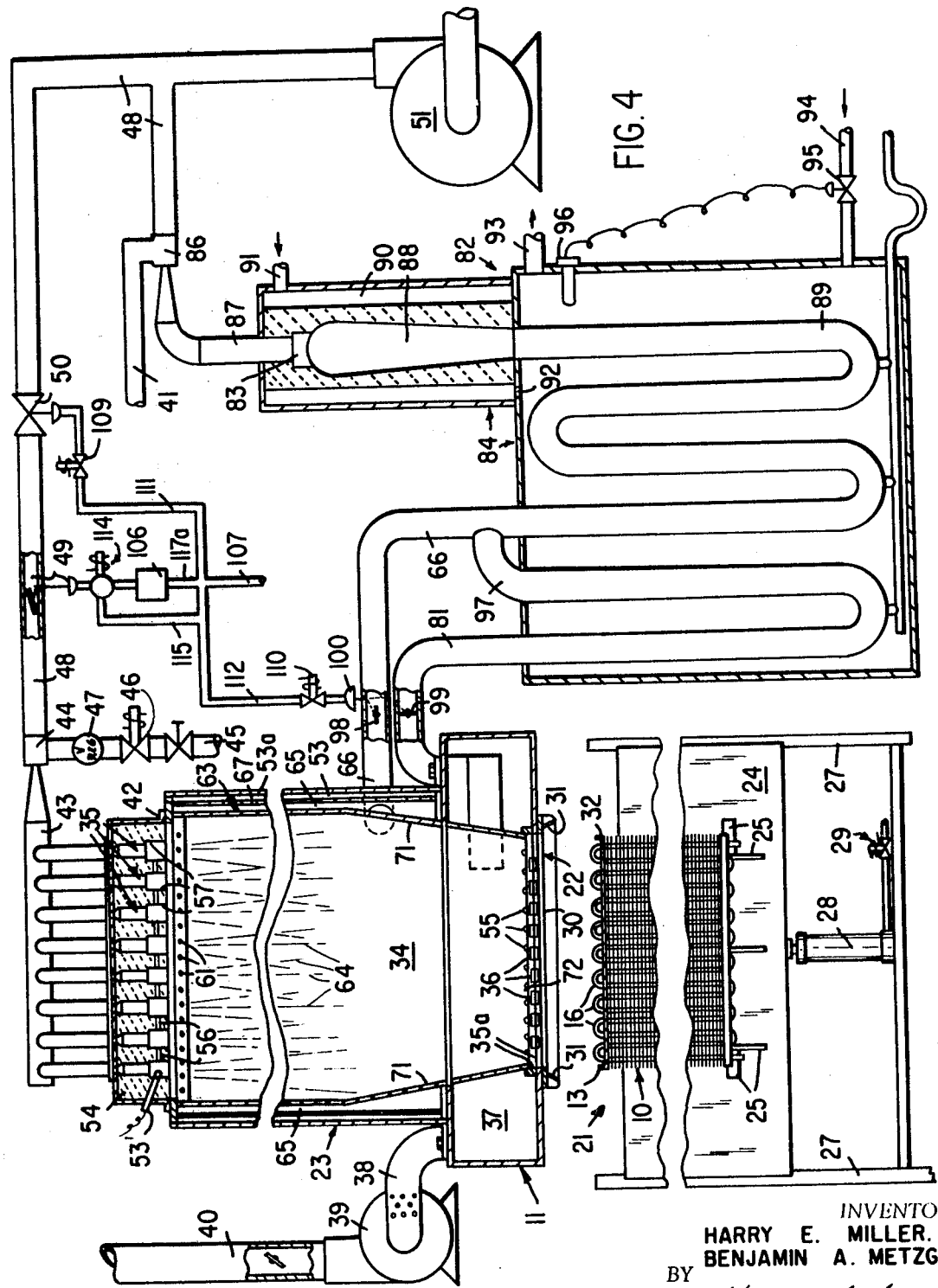

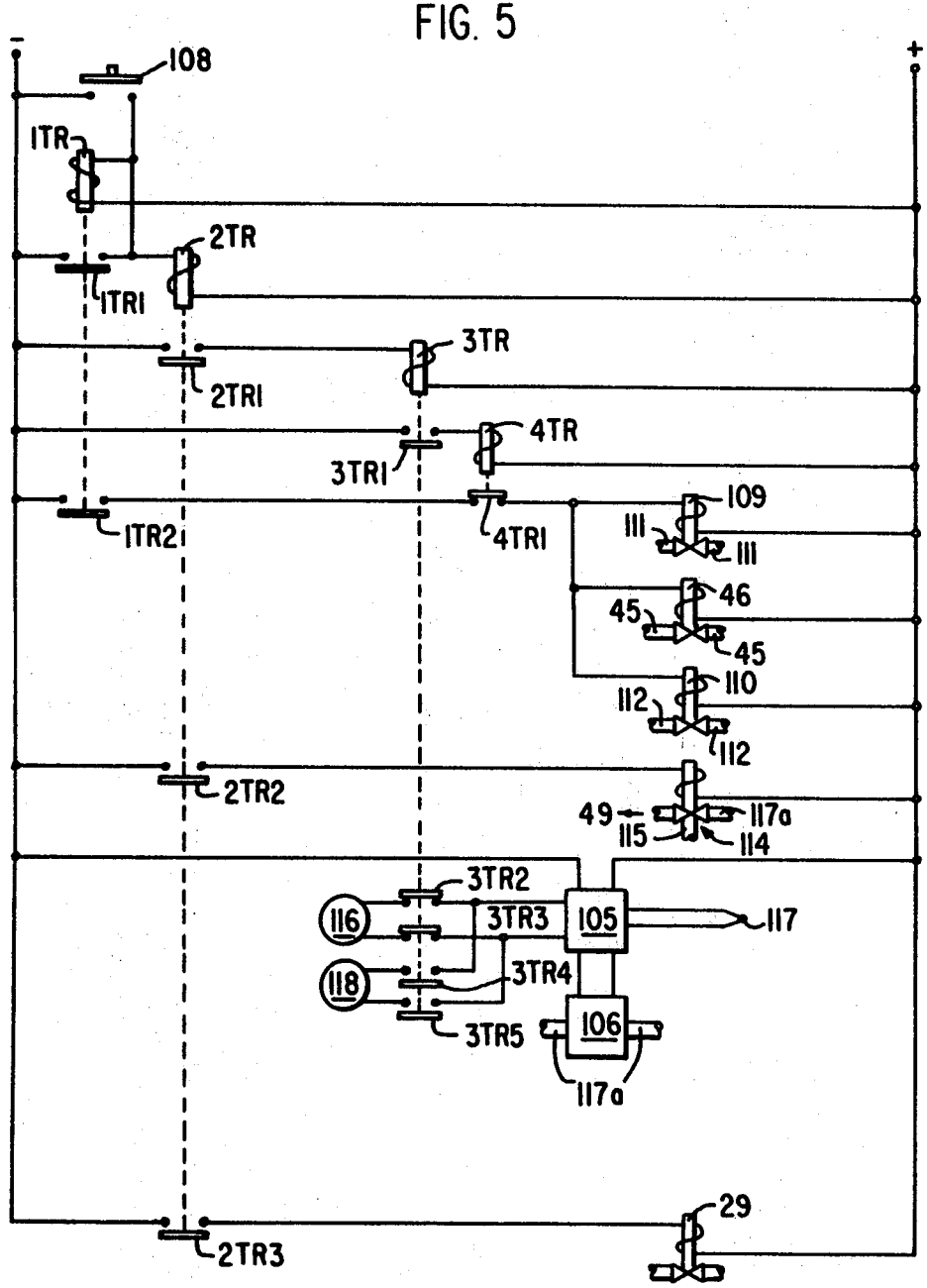

ATTORNEY.

United States Patent Office 3,605,255
Patented Sept. 20, 1971

3,605,255
METHOD FOR BRAZING
Benjamin A. Metzger, Shaker Heights, Ohio, and Harry E. Miller, Westmoreland, Pa., assignors to Carrier Corporation, Syracuse, N.Y.
Original application Jan. 19, 1966, Ser. No. 521,681. Divided and this application June 17, 1968, Ser. No. 753,301
Int. Cl. B23k $31/02$, $35/38$
U.S. Cl. 29—494                          5 Claims

ABSTRACT OF THE DISCLOSURE

A method of brazing structural parts which includes the steps of pre-heating the parts to a temperature below the melting point of the brazing alloy and thereafter supplying heating at a temperature in excess of the melting point of the brazing alloy to accomplish unison of the parts.

---

This application is a division of copending application, Ser. No. 521,681, filed Jan. 19, 1966, now Pat. No. 3,426,953, entitled "Method and Apparatus for Brazing."

This invention pertains to the art of brazing and more particularly to a method of brazing and the apparatus for carrying out such method.

The invention is particularly applicable to the brazing of the bell and spigot connections between the return bends and tubes of a thin-plate type heat exchanger and will be described with particular reference thereto, although it will be appreciated that the invention has other and broader applications and may be employed for the purpose of heating other workpieces, either for brazing, soldering or otherwise. Brazing and soldering are considered functionally identical.

Thin-plate type heat exchangers normally are comprised of a plurality of spaced parallel-extending copper tubes having fitted thereover a plurality of close spaced aluminum fins which serve as a heat radiating surface. Adjacent the ends of the tubes is a galvanized steel sheet which forms a header. The ends of the copper tubes are interconnected by U-shaped, copper return bends and the joint therebetween is usually of the brazed bell and spigot type. Normally, the brazing is accomplished by surrounding the end of the bell with a ring of brazing alloy and then bringing the joint and alloy up to the alloy melting temperature (usually around 1500° F.) by means of externally applied heat. The alloy melts and flows into the joint by capillary action. For proper brazing, the temperature of the entire joint must be raised at least to the alloy melting temperature but no portion of the joint can become so hot that the brazing alloy boils or becomes so liquid that it runs out of the joint.

Heretofore these joints have been heated by means of high temperature flames having a temperature on the order of 3000° F. impinging directly on the joint or by means of radiant heat or a combination of both. In either event, only the front side, that is the portion of the joint contacted by the flame or in the line of the rays from the radiant heat source, was directly heated. The back side or shadow portion was heated indirectly by the conduction of heat through the metal from the directly heated portions, which conduction requires time.

One of the principal problems with the flame or radiant heat method of heating has been to obtain proper heating not only of all the joints of an exchanger, but around each joint and to do this in a minimum period of time. Thus, because of the time required for the heat to be conducted to the back side of the joint and the temperature differential required to cause such heat to flow, in order to prevent overheating of the front side of the joint, oftentimes the back side would be insufficiently heated resulting in inadequate flow of the brazing alloy. Alternatively, in order to insure that the back side of the joint was properly heated, the front side on which the flame was impinging would be overheated, resulting in an excessive liquidity of the brazing alloy. In either event, defective joints resulted.

Further, when a large number of joints were to be heated simultaneously, uniform heating of each joint relative to the other was extremely difficult to obtain, requiring time consuming adjustments of the burners and numerous defective units until the proper adjustment and heat distribution could be obtained.

Numerous expedients have been used in the past to overcome the problems of such underheating or overheating. For example, brazing alloys have been employed having a range of melting temperatures such that the proper flow characteristics would result in the joint even though the joint was heated non-uniformly. Such brazing alloys are expensive compared to a brazing alloy having a single predeterminable melting temperature.

A further problem has been that of overheating and damaging of the aluminum fins and/or the galvanizing coating on the header sheet due to accidental impingement of the high temperature flames thereon.

A still further problem, particularly when using a flame torch, has been that the brazing takes place in ambient air such that even though a reducing type flame is employed, as soon as the heating is terminated, the hot copper is then exposed to the oxygen of the atmosphere and rapidly oxidizes to a black color which, while not affecting the tightness of the joint, results in an unsightly product. Also using a flame, the fluxes used often oxidized when exposed to the atmosphere at high temperatures and their effectiveness reduced.

The present invention contemplates a method of brazing and apparatus for carrying out such method which overcomes all of the above referred to difficulties and others and enables the joint to be rapidly heated to a uniform temperature, enables the use of a less expensive brazing alloy and results in brazed members having a bright, unoxidized surface.

In accordance with a broad aspect of the present invention, a method of brazing metallic parts is provided using a brazing alloy having a known melting temperature comprising the steps of providing a gas having a temperature close to the brazing alloy melting temperature, flowing such gas across the parts to be brazed at a sufficiently high velocity that the eddy currents and swirling of the gas as it passes over the joint result in heat being conducted rapidly to the joint over substantially its entire area, and continuing the flow of gas until the parts and brazing alloy are uniformly heated to a temperature just above the brazing alloy melting temperature.

Further in accordance with the invention, the gas temperature initially is substantially above the alloy melting temperature and is then reduced, as the parts and alloy approach the alloy melting temperature such as to hold the parts and alloy at a temperature just below the alloy melting temperature, and then the gas temperature is raised until the alloy melts.

Further in accordance with the invention, a method of brazing metal parts using a brazing alloy of known melting temperature is provided comprising burning at a point substantially spaced from the parts a fuel-air mixture to produce a first flue gas having a temperature substantially above the alloy melting temperature, burning at a point substantially spaced from the parts a fuel-air mixture to produce a second flue gas at a temperature substantially above the alloy melting temperature, cooling the second flue gas to a temperature substantially below the alloy melting temperature, mixing the two flue gases and causing them to flow at high velocity over the parts to be brazed.

Such first and second flue gases may be produced by a single burner with the resultant flue gas divided into two portions or by two burners each producing a separate stream of flue gas.

Further in accordance with the invention, the temperature of the two mixed flue gases is so controlled that as the temperature of the parts and the brazing alloy is increased, the temperature of the mixed gases is decreased from a temperature substantially above the alloy melting temperature to a temperature close enough to the alloy melting temperature that the parts and brazing alloy are uniformly heated to a temperature just below the alloy melting temperature and the temperature of the mixed flue gases is then raised above the melting temperature of the alloy until such alloy is entirely melted.

Further in accordance with the invention, the air-fuel mixtures employed are such as to produce a reducing type flue gas and after the brazing alloy is melted, a non-oxidizing gas having a temperature below the rapid oxidation temperature of the metal parts is flowed over the parts until the temperature thereof is below the rapid oxidation temperature.

Further in accordance with the invention, apparatus for brazing metallic parts is provided comprising in combination means for producing a stream of high temperature flue gas, means for cooling such gas to a carefully controlled temperature and means for flowing said stream at high velocity over the parts to be brazed.

Further in accordance with the invention, apparatus for brazing metallic parts is provided comprising in combination, means for producing first and second streams of high temperature flue gas, means for cooling said second stream and means for mixing said two streams and flowing said mixed streams at high velocity over parts to be brazed.

Melting temperature as used herein is that temperature at which a brazing alloy becomes fully liquid and can flow as an alloy by capillary action between the surfaces of the metals to be brazed. For most copper or aluminum brazing alloys, this varies from 1500° F. to 700° F. or even lower.

With copper brazing alloys, it is known that there is a temperature below the melting temperature at which one or more of the metal constituents become sufficiently liquid that it or they will commence to migrate from the alloy. Such temperature can vary to as much as 50° F. below the actual melting temperature. Below the melting temperature as used herein means below this temperature where migration becomes detrimental in the particular brazing operation.

Rapid oxidation temperature is that temperature below which the workpiece will oxidize if exposed to the atmosphere for short periods of time, e.g., two minutes. For copper this is approximately 500° F.

High temperature is a temperature substantially above the "melting temperature" and is intended to connote the flame and flue gas temperature of an approximately ideal flue-air mixture, e.g., 2000–3000° F.

Cool temperature is a temperature substantially below the melting temperature but above the rapid oxidation temperature, e.g., 600° F.

Cold temperature is a temperature below the rapid oxidation temperature, e.g., 100° F.

The principal object of the invention is the provision of a new and improved method of brazing and apparatus for carrying out same which enables the joint to be rapidly heated to a uniform temperature without the danger of overheating and which insures that properly brazed joints will always result.

A further object of the invention is the provision of a new and improved method for brazing joints wherein a hot flue gas of a carefully controlled temperature, as distinguished from a flame, is projected directly onto the joints for raising same to the brazing temperature.

A further object of the invention is the provision of a new and improved method of brazing wherein satisfactory brazed joints may be obtained using the cheaper and more readily obtainable brazing alloys.

Another object of the invention is the provision of a new and improved method of brazing wherein overheating of the parts is prevented by carefully controlling the temperature of the heating medium and uniformity of heating is obtained by causing turbulent flow and scrubbing of the parts by the heating medium.

Another object of the invention is the provision of a new and improved method of controlling the temperature of a hot reducing type flue gas used for heating metallic parts to a brazing temperature which results in accurate control of the gas and parts temperature and rapid heating to a uniform temperature of the parts.

Another object of the invention is the provision of a new and improved method of brazing which will readily braze aluminum.

Another object of the invention is the provision of a new and improved method of brazing which enables the parts to be heated just below the brazing alloy melting temperature until the entire joint is uniformly heated and then to be further heated until the brazing alloy is melted.

Still another object of the invention is the provision of a new and improved method of brazing wherein the joint at all times until after it has been cooled below the rapid oxidation temperature of the metals is subjected to a reducing type atmosphere.

Another object is the provision of a method of heating joints for brazing where the problems of the fluxes oxidizing are obviated.

The invention may take physical form in certain steps and combinations of steps and certain parts and combinations of parts, a preferred embodiment of which will be described in detail in this specification and illustrated in the accompanying drawing which is a part hereof and wherein:

FIG. 1 is a fragmentary, perspective view with the parts broken away and removed for the purposes of illustration of a plate thin type heat exchanger of a type with which the present invention is particularly adapted to be employed;

FIG. 2 is a foreshortened, side view with parts broken away for clearer illustration, of a portion of a brazing device illustrating a preferred embodiment of the invention;

FIG. 3 is an enlarged fragmentary sectional side view of a brazing mouth portion of the device shown in FIG. 2;

FIG. 4 is a foreshortened, schematic front view with parts broken away for clear illustration of a brazing device including a portion of the control system to a reduced scale;

FIG. 5 is a schematic wire diagram of a portion of the control system; and,

Figure 6:
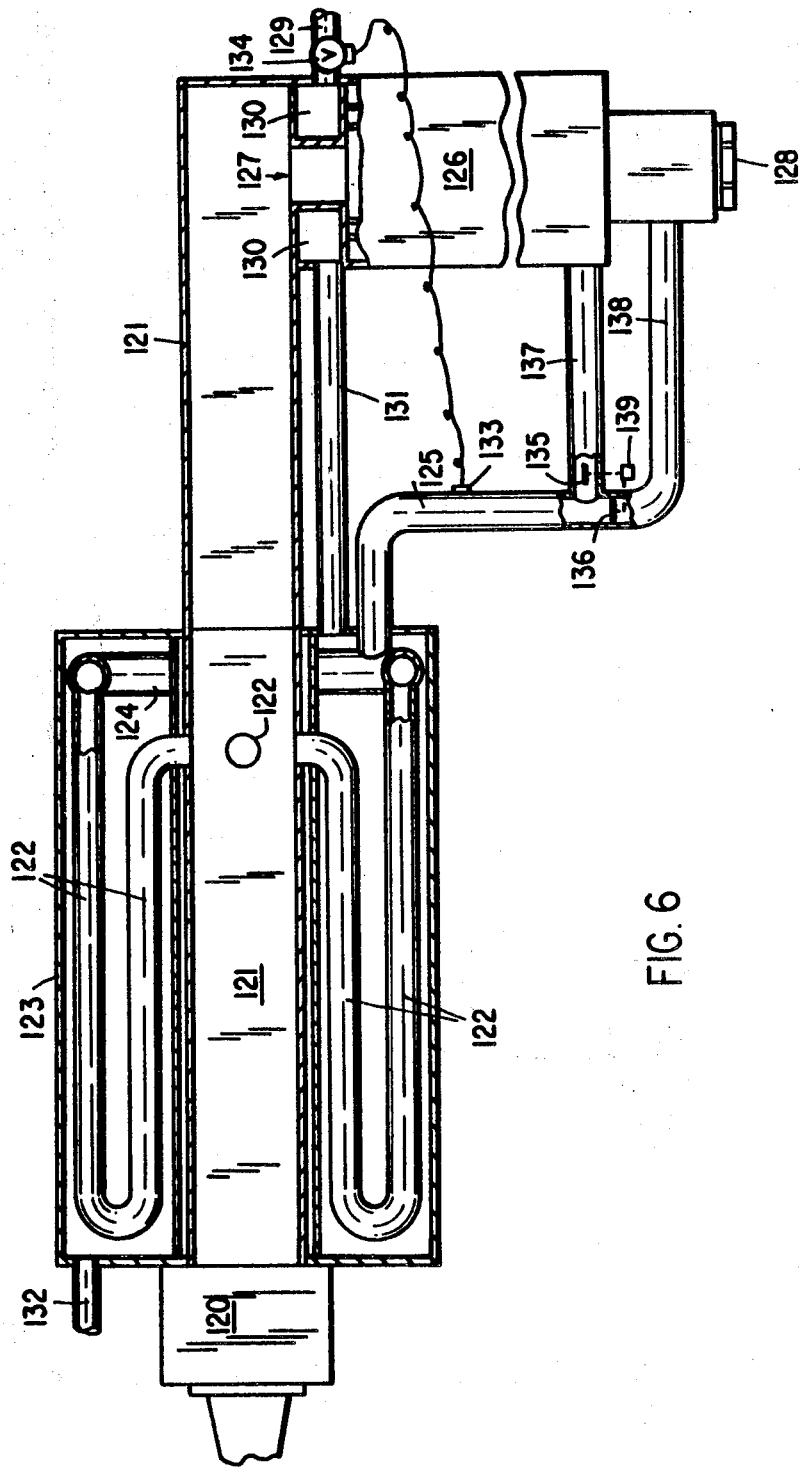
FIG. 6 is a foreshortened sectional side view of another embodiment of the brazing device.

Referring now to the drawings wherein the showings are for the purposes of illustrating a preferred embodiment of the invention only and not for the purposes of limiting same, FIGS. 1 and 4 show a workpiece 10 ready to be inserted into brazing position in a brazing device comprised generally of a first set of burners 35 for producing a first stream of high temperature flue gas, a second set of burners 83 for producing a second stream of high temperature flue gas, cooling means 84 for reducing the temperature of the second stream of flue gas to a cool temperature and a plenum for mixing the two streams of gases prior to flowing it over the workpiece 10. Additionally the cooling means 84 reduces the temperature of the second stream of flue gas to a cold temperature.

The workpiece 10 may take any one of a number of different forms, but in the embodiment shown, includes U-shaped tubes 12 of any desired metal, e.g., copper, aluminum or steel, extending through and mounted in opposed metal tube sheets 13, with metal fins 14 between the tube sheets, each fin having apertures 15 receiving the tubes 12 and tightly gripping the tubes to provide satisfactory heat exchange. Return bends 16 of the same or different metal join free open ends of adjacent tubes 12 by means of brazed bell and spigot joints 17. A ring 18 of suitable material for brazing the particular metal employed is telescoped on the return bend 16 and is seated atop the bell of the mated tube 12. This material may be any known brazing alloy but when brazing copper and because of the invention, may be one of the cheaper brazing alloys, e.g., plain copper zinc or "Phos-copper," having a narrow range of melting temperatures before it becomes so liquid it will run out of the joint as distinguished from the more expensive silver containing brazing alloys which have a wider range of melting temperatures and do not tend to become as liquid as the other alloys. If aluminum is to be brazed, conventional aluminum solders are used. Fluxes, solid paste or liquid (not shown) may be employed.

The heat exchanger 10, ready for brazing, is positioned on a workholder 21 (FIGS. 2 and 4) of the brazing device 11 for movement upwardly into an open brazing mouth 22 of a brazing box 23. The heat exchanger 10 is properly positioned by blocks 25 on the base 24. Pairs of wheels 26 (FIG. 2) on the workholder base 24 ride in inclined tracks 27 for moving the workpiece positioned on the base into and out of the brazing mouth 22 of the brazing box 23 which is similarly inclined to receive the workpiece 10. Suitable means, such as a pneumatic motor or ram 28 mounted at the bottom of the tracks 27, is connected through a solenoid actuated control valve 29 with a source of compressed air at 100 p.s.i.g., for example, for moving the base 24 and heat exchanger 11 into and out of the brazing mouth 22.

The illustrated heat exchanger 10 has a rectangular tube sheet 13 and the brazing mouth 22 (FIGS. 2-4) has a conforming rectangular configuration of a seat 30 and downwardly diverging lips 31 extending from four sides of the seat for guiding an upwardly extending peripheral flange 32 of the tube sheet onto the seat 30.

A wall 35a has ports 36 slightly above the seat 27 and hot gas is exhausted through these ports. The ports 36 communicate with an exhaust chamber 37 about the plenum 34 and the flue gas is withdrawn from the chamber through a duct 38 by means of a pump 39 which discharges through a suitable exhaust stack 40.

Burners 35 (FIGS. 2 and 4) at the top of the brazing box 23 provide a high temperature gas which is projected downwardly toward the mouth 22 through a chamber or plenum 23 of the brazing box 23. One or more burners 35 may be provided, depending upon the intended size of the workpiece to be brazed, and the illustrated brazing device has eight burners horizontally aligned across a top end wall 42 of the brazing box. Each burner 35 receives a suitable combustible mixture, such as gas and air, through a manifold or supply line 43 (FIG. 4) from a suitable mixing device such as a venturi 44 which receives fuel gas through a gas supply line 45 having a solenoid operated shut-off valve 46 and a pressure regulator 47, and combustion air through an air supply line 48 having a pneumatic diaphragm actuated modulating air control valve 49 and a pneumatic actuted cylinder shut-off valve 50. A blower 51 supplies air to the line 43. The quantity of combustion air passing through the venturi 44 is regulated by the valve 49 and the quantity of gas mixing with this air is regulated by the venturi in substantially direct proportion to the air flow rate to provide a substantially constant fuel-air ratio of the combustible mixture passing to the burners 35. A pilot flame igniter 53 in a ceramic head 54 of the burners 35 ignites the combustible mixture at an end one of the burners 33, and a portion of the resultant flame 55 (FIG. 2) travels through passages 56 in the head between adjacent burners to ignite all of the burners. Each burner flame 55 passes through a burner tunnel 57 in the ceramic head to provide a stream 58 of high temperature flue gas and projects the streams downwardly to provide substantially discrete streams each diverging at about 12° from the respective tunnel 57 and associated in a laminar flow pattern at high velocity. Each tunnel 57 diverges outwardly through a plurality of steps, as 59 (FIG. 2), which cause flame turbulence and shorten the flame 55. The air-fuel mixture is always so proportioned so that there is a slight excess fuel such that the resultant flue gas 53 is a reducing type gas having a temperature substantially the same as a brazing torch flame, that is about 3000° F. This high temperature must be considerably reduced before projecting it onto the workpiece 10.

In accordance with the invention, the temperature of this high temperature gas is reduced by mixing it with a stream of cool flue gas. This cool flue gas may be produced by diverting a portion of the high temperature stream 53 and flowing it through a cooling means but in the preferred embodiment is provided by a flue gas generator 82 (FIG. 4) which includes a burner 83 and a cooler 84. Gas from a gas supply line 41 and air from the air supply line 48 are mixed in a suitable mixing venturi 86 to provide a constant fuel-air ratio as previously described with reference to venturi 44. The combustible mixture passes through a duct 87 to the burner 83 atop a ceramic plenum 88 of the flue gas generator 82. The flue gas generator may operate in any suitable manner and fuel and air controls are therefore not shown. The fuel air ratio is always such as to produce a reducing type flue gas and is thus at a temperature of approximately 3000° F. This high temperature flue gas passes through the plenum and into a duct 89 in the cooler 84. Cooler 84 may take a number of different forms, e.g., water injection, but in the embodiment shown, is water entering the top of a water cooled jacket 91 about the plenum 83. A cooling water supply line 90 supplies cooling water which circulates about the plenum passing through a port 92 and circulates about the duct 89 before leaving the cooler through a water discharge line 93. Additional cooling water enters through a second cooling water supply line 94 at the bottom of the cooler 84 and after circulating about the duct 89 is discharged through the discharge line 93. A modulating control valve 95 in the second cooling water supply line 94 is responsive to an adjustable cooling water temperature sensor 96 at the discharge line 93 to control the final temperature of the flue gas.

The duct 89 in the cooler 84 communicates with the cool flue gas duct 66 and another cooling duct 97 branches off of the duct 66 and makes additional passes through the cooler 84 and then communicates with the cold flue gas duct 81. Suitable shut-off valves or dampers 98 and 99 are provided in the ducts 66 and 81, respectively, and are interconnected with a suitable pneumatic actuator 100 so that when one valve is fully open the other valve is closed.

This cool reducing flue gas is injected into the brazing box 23 from duct 66 through ports 61 (FIGS. 2 and 4) in a wall immediately downstream of the tunnels 57. The cool flue gas passes through the ports 61 in a suitable direction, for example, in a direction generally normal to the axis of the flames 55 and streams 58, to mix with the flames 55 and the resultant high temperature streams 58 of flue gas to form cool streams of flue gas 62 each encasing a high temperature stream 58 to reduce the heat transfer to a side wall 63 of the plenum 34 and to reduce the temperature of the high temperature streams 58 and therewith form resultant hot laminar flow streams of reducing flue gas 64.

A jacket or chamber 65 about the outside of the plenum side wall 63 communicates at a lower portion with a cool flue gas supply duct 66 and at an upper portion with the ports 61 for the passage of the flue gas into the plenum 34 and for reducing heat transfer from the plenum to ambient air outside the brazing box. The chamber 65 has an outer wall 67 spaced from and extending about the plenum side wall 63, and the cool flue gas supply duct 66 opens through this wall just above the brazing box mouth 22. A dead air chamber 68 is provided between the wall 67 and an outer wall 69 of the brazing box to further reduce heat loss from the plenum 34 to ambient air about the brazing box.

Near the lower end of the plenum 34 the plenum side wall 63 has a portion 71 which converges inwardly to an orifice 72 at the lower end of the wall 63. This orifice opens into an expansion chamber 73, within the wall 35a which is spaced transversely outwardly from the orifice 72, and above the operatively positioned workpiece 10 so that the hot flue gas streams 64 are compressed as they pass between the converging wall portions 71 and through the orifice 73, and then expand into the expansion chamber 73. The gases flow across joint 16 and thence out through the exhaust parts 36. In the illustrated embodiment, the flue gases pass through the orifice 72 at a velocity believed to be between 5,000 and 30,000 feet per minute. This velocity is sufficiently high to cause turbulent scrubbing of the workpiece by the hot gas so that heat is rapidly conducted to all surfaces of the joints. The invention is to be distinguished from an oven where hot gases are simply circulated over the workpiece. In the present invention the hot gases are generated, projected onto the workpieces and exhausted. This is particularly of value with copper or aluminum because the parts are always exposed to a controlled atmosphere. The same is true of the flux if used and deterioration of the flux by oxidation is prevented.

Cold reducing flue gas from duct 81 enters the expansion chamber 73 through ports 79 at the lower end of the converging side walls 71 and turbulently scrubs the workpiece 10 at high velocity. The ports 79 open off a chamber 80 on either side of the converging side walls 71 and the chamber communicates with a cold gas supply duct 81. The cold flue gas is withdrawn from the chamber 73 through the exhaust ports 36 in the same manner as the hot flue gas.

OPERATION

With the workpiece 10 positioned on the lower work holder 21 so that the mouth 22 of the plenum 34 is open, the gas valve 48, the air shutoff valve 50 and the cool gas valve 98, are opened and the modulating air valve 49 is set for small air flow. The pilot 50 ignites the burners 35 with substantially no back pressure in the plenum and the plenum is preheated to about 1000° F. in about ten seconds.

Simultaneously, gas flows through venturi 86, is mixed with the air from the blower 51, burns in burner 87, flows through plenum 88 as a flue gas at a high temperature on the order of 3000° F. The air-fuel mixture is such that the gas is a reducing flue gas. The gas flows through cooler 84 and is cooled to approximately 600° F. Higher or lower temperatures can be used. This cool flue gas flows through duct 66, valve 98, duct 65 and passages 61 into chamber 34. Blower 39 is continuously operating to exhaust this gas.

The apparatus is then ready for operation. The ram 28 is actuated by opening its control valve 29 to move the work holder 21 and workpiece 10 upwardly to brazing position with the workpiece seated in the mouth 22 as shown by dotted lines in FIG. 2.

In order to prevent oxidation of the inside of the copper tubes 12 and return bends 16 during brazing, air may be removed from within the coil by passing flue gas through the coil from a source and by means not shown.

Next, the valves 46 and 49 are fully opened to permit a fuel-air mixture to flow into the burners 35 which burn to produce a flue gas having a temperature of approximately 3000° F. The air-fuel mixtures as previously pointed out, is such that the gas is a reducing flue gas. This high temperature gas then flows downwardly through the plenum and is mixed with the cool flue gas entering the plenum through the passages 61. These two flue gases mix, flow downwardly through the mouth 22, across the bends 16 and thence outwardly through the exhaust stack 40, being drawn out by the blower 30.

The volume of gas flowing in relation to the area of the throat 30 is such as to produce a minimum velocity sufficient to produce eddy currents and scrubbing around the bends so that the heat of the gas is conducted generally simultaneously to all surfaces of the parts. It is believed that the velocity required to produce such scrubbing is in excess of 2000 feet per minute and preferably on the order of 10,000 feet per minute. The maximum velocity is that where the brazing alloy as it melts is blown into the exhaust.

The temperature resulting from the mixture of the two gases is very carefully controlled. This may be done by controlling the amount of fuel and air being supplied to either burners 35, or to burners 83 or both; or the amounts of fuel and air to both sets of burners may be held in constant ratio and the amount of cooling on the flue gas from burner 83 may be controlled; or a portion of either gas stream may be diverted to the atmosphere. In the event a single set of burners provide the source for both streams of gas, the portion of the initial high temperature stream diverted to the cooler 84 may be varied.

In any event the temperature of the mixture of the two gases as it initially commences to flow over the workpiece 10 is preferably higher than the melting temperature of the ring 18. This results in a rapid preheating of the joints.

An electronic temperature sensing and regulator control 105 senses the temperature of the return bends 10 and rings 18 and as the temperature thereof approaches the melting temperature of the rings, passes a suitable electrical signal to an electropneumatic converter 106 in a pneumatic control circuit (FIG. 4) which reduces the amount of gas and air flowing into the burners 35. As the amount of cool gas remains constant, this reduces the temperature of the mixture of gases flowing across the return bends 16. In accordance with the invention, the temperature of the gas mixture is reduced to a temperature just close enough to the brazing alloy melting temperature, to make up for losses of heat in the joint by conduction of radiation. These gases are allowed to flow across the joint at high velocity until the temperature of the joint is uniform on all sides. This may be referred to as the preheat cycle and the preheat temperature selected is preferably just below the melting temperature of the brazing filler rings 18. Thus, at the end of the preheat cycle, the brazing filler rings 18 are essentially solid.

At the end of the preheat cycle, the brazing cycle commences. The amount of gas and air flowing to the venturi 44 is increased so that the gas flowing across the bends 16 is above the brazing temperature, e.g., about 115–500° F. until the filler rings 18 melt. This normally requires about seven to eight seconds. The melted filler metal flows by capillary action between the preheated bells of the tubes 12 and the mated spigot ends of the return bends 16. Because the joint was at a temperature close to the brazing alloy melting temperature, the entire joint can be heated above the alloy melting temperature before any portion can be overheated.

At the end of the brazing cycle, the burners 35 are turned off by closing the gas and air shutoff valves 46 and 60, respectively, and the cool flue gas valve 98 is closed simultaneously with the opening of the cold flue gas valve 99. Cold flue gas at a cold temperature of approximately 100° F. then flows through the duct 81 and ports 79 to cool the workpiece 10 to a temperature below the rapid oxidation temperature in about seventy-five seconds.

It is to be noted that the cold flue gas in the duct 81 is reducing flue gas and the gas is allowed to flow until the temperature of the copper in the bends 16 is below the rapid oxidizing temperature of copper (500° F.). The production of black, flaky oxides on the tubes when exposed to the air is thus prevented. 500° F. is below the softening temperature of aluminum.

The ram control valve 29 is closed and vented to lower the workholder 21 and the brazed and cooled workpiece 10. The cycle takes about two minutes.

In this operation it is to be noted that the blower 39 is continuously exhausting the flue gases from the plenum 37 with the result that the gases as they flow over the bends 16 are flowing at a very high velocity on the order of 2000 feet per minute or greater. This high velocity gas conducts heat to the metal very rapidly. The gas as it flows over the return bends has a very large amount of turbulence and contacts all surfaces of the metal. The metal is heated not only on the side where the gases impinge, but also on the leeward or back side. Time is not required to allow the heat to conduct through the metal from the side of the impingement of the gases to the back or shadow side. A much more rapid heating results. Furthermore, as the temperature of the joints increases due to such heating, the temperature of the games being impinged thereon is gradually reduced so that before any portion of the joint has reached the melting temperature of the brazing alloy, the temperature of the gas being impinged on the joint is reduced to a temperature below this melting temperature. It is thus impossible for the brazing alloy at any time to melt during this preheating operation. As much time as desired may be allowed to bring each joint around its entire circumference to a uniform temperature and for each joint to be at a uniform temperature compared to all the other joints.

It is to be noted that the brazing cycle only involves raising the temperature of the pieces approximately ten to fifteen degrees.

CONTROL SYSTEM

The above sequence of operations and temperatures may be controlled and regulated in a number of different manners, e.g., all temperature sensing, all timing or in accordance with the preferred embodiment, a combination of both.

Thus timing of the brazing cycle is controlled by an electrical and pneumatic system (FIGS. 4 and 5) to provide the ignition period during which the brazing box burners 35 are ignited, a preheat period and a brazing period during which periods the hot gas passes through the plenum 34 and against the workpieces 10, and the cooling period during which the cold flue gas from the generator 82 cools the brazed workpiece. During the preheat and brazing periods an electrical timing circuit (FIG. 5) renders an electronic temperature sensing and regulating control 105 operative for passing a suitable electrical signal to an electropneumatic converter 106 in a pneumatic control circuit (FIG. 4) for regulating the output of the burners 35. Operating air for the pneumatic circuit is provided through a supply line 107 at about 25 p.s.i.g.

With the combustion air blower 51 and the flue gas exhaust blower 39 in operation, and the pilot 53 burning, a start push bottom switch 108 is momentarily depressed to close a circuit energizing an instantly operating, terminal delay timing relay 1TR and causing its two contacts 1TR1 and 1TR2 to close, starting the ignition period. The contact 1TR1 provides a holding circuit for the 1TR relay and closes an energizing circuit to a delayed operating relay 2TR. Closing the contact 1TR2 closes a circuit to three solenoid operated valves 46, 109 and 110 (FIG. 4), opening these valves. The gas shut-off valve 46 is opened for the passage of gas through the gas supply line 45 to the venturi 44. The valve 109 is in a branch 111 between the control air supply line 107 and the actuator of the shut-off valve 50 in the air supply duct 48 to the plenum burner 35. When energized, the valve 109 opens, causing the valve 50 to open for supplying combustion air to the burners 35. The valve 110 is in another branch 112 between the control air supply line 107 and the diaphragm actuator 100, and opens to pass control air to the actuator so that the cold gas valve 99 is closed and the cool gas valve 98 is open for passing cool flue gas through the ports 61 below the burner tunnels 57. During the ignition period the modulating air control valve 49 in the combustion air supply line 48 is in position for passing but a small quantity of air to the plenum burners 35, as regulated by low air pressure from a solenoid operated three-way control valve 114 in a branch 115 from the control air supply line 107.

Following a delay of about 10 seconds during which time the plenum burners 35 are ignited by the pilot 53′, the relay 2TR operates to close its three contacts 2TR1, 2TR2, and 2TR3, ending the ignition period and starting the preheat period. Closing of the contact 2TR1 energizes an instantly operating, terminal delay relay 3TR; closing of contact 2TR2 operates the three-way air valve 114 to place the pneumatic converter 106 in circuit for controlling the hot gas temperature in the brazing chamber; and the contact 2TR3 closes a circuit to the normally closed solenoid operated ram control valve 29, opening this valve for passing air into the ram 28 and raising the workpiece 10 into brazing position in the brazer mouth 22. The preheat temperature is manually set on a suitable control station 116 (such as Foxboro M/67TG Manual Control Station) in circuit through closed contacts 3TR2 and 3TR3 for rendering an electric signal to the temperature controller 105 (such as Foxboro Model 61 or 62 Controller). The temperature controller also receives an electrical signal from a suitable temperature sensor such as a thermocouple 117 (FIG. 3) indicating the hot gas temperature at the brazer mouth, and sends a suitable electrical signal to the electropneumatic converter in a branch 117a between the control air supply line 107 and the three-way valve 114, for regulating the quantity of combustible mixture to the plenum burner and therefore the hot gas temperature.

The brazing period starts at the end of the initial delay of relay 3TR as its normally closed contacts 3TR2 and 3TR3 open, thus opening the circuit from the preheat manual temperature control station 116 and its normally open contacts 3TR4 and 3TR5 close, thus closing a circuit between a similar manually adjustable brazing temperature control station 116 and the temperature controller 105 so that the temperature controller passes a suitable electrical signal to the electropneumatic converter log for increasing the quantity of combustible mixture passed to the brazer burners 35, thereby increasing the hot gas temperature at the workpiece. Also, at the end of the initial delay of relay 3TR its contact 3TR1 closes, thereby closing a circuit to an instantly operating terminal delay timer relay 4TR. The brazing period commences with operation of the timer relay 3TR and terminates after the delay of timer relay 4TR.

Upon operation of the timer relay 4TR its sole contact 4TR1 opens, starting the cooling period. This contact is in circuit with contact 1TR2 and upon opening breaks the circuit to the three valves 46, 109, and 110, causing the pneumatic control system to shut down the brazer burners 35 and operate the flue gas generator control 110 to close valve 98 and open valve 99 to pass relatively cold flue gas through the duct 66 and the ports 79 to the workpiece for lowering the workpiece temperature below its rapid oxidizing temperature.

When the timer relay 1TR reaches its final delay point its contact 1TR1 opens, opening the circuit to timer relay 2TR causing its contacts to open. Opening of contact 2TR3 opens the circuit to solenoid valve 20 for closing this valve and relieving the air pressure on the hydraulic ram 28, causing the workpiece to be lowered from the brazing box mouth, and completing the brazing cycle.

Another embodiment of the brazing device is illustrated in FIG. 6 wherein a burner 120 generates a flame and resultant flue which passes gas into a large cylindrical furnace 121. From the furnace a portion of the flue gas passes through a cooler, e.g., water spray injection on a plurality of cooling coils 122 in a cooler shell 123, and then into a manifold 124 which communicates through a supply duct 125 with a brazing box 126. From the furnace the portion of the flue gas not passing through the cooling coils 122 passes to an end of the furnace 121 opposite the burner 120, through a water cooled valve 127 at an upper portion of the brazing box 126 and then downwardly to a brazing mouth 123 and the workpiece (not shown).

Water for cooling the flue gas regulating valve 127 is provided through a supply pipe 129 opening into a valve cooling chamber 130 and then passes to the flue gas cooler shell 123 through a pipe 131 and leaves the shell through a discharge line 132. A suitable temperature sensor 133 may be provided in the cool flue gas duct 125 for operating a modulating valve 134 in the water supply line 129 for regulating the quantity of cooling water passing through the cooler shell 123, thereby regulating the cool flue gas temperature and preferably maintaining a constant temperature of 100° F., for example, in the duct 125. Suitable valves, as 135 and 136, are provided in branches 137 and 138, respectively, of the flue gas supply duct 125. These valves are alternately fully open and closed by an operator 139 in the same manner as operator 100 alternately opens and closes valves 98 and 99 in the embodiment of FIG. 4, so that flue gas may pass through open valve 135, when valve 136 is closed, and into the brazing box 126 to units with the flue gas entering through the valve 127. Output of the burner 120 is varied to provide the desired temperature for preheating and brazing, as previously described. With the valve 135 closed and valve 136 open, the cool flue gas cools the brazed workpiece, as previously described.

While the previously described method and device has been developed to provide better brazing of return bends on heat exchanger tubes, the invention will be found to be equally advantageous in many other brazing operations, particularly in production brazing, and it should be understood that the invention is not limited to the previously described and illustrated embodiments but may be otherwise embodied within the scope of the following claims.

Having thus described our invention, we claim:

1. A method of brazing comprising placing the parts to be brazed in a gas conduit with the parts having a brazing alloy of a predetermined melting temperature adjacent the joint, providing a gas at a temperature substantially above the melting temperature, cooling said gas, directing said cooled gas through said conduit onto said parts at a velocity sufficient to provide turbulent scrubbing of said parts and alloy until said alloy and parts at least adjacent the joint to be brazed are substantially uniformly heated to a temperature below said melting temperature, raising said gas temperature above said melting temperature until said alloy melts and cooling said parts to below said melting temperature.

2. A method of brazing a joint of two metals with a brazing alloy of a predetermined melting temperature comprising placing the joint in a gas conduit, burning a fuel-air mixture, with insufficient air so as to produce a first reducing flue gas at a temperature substantially above said melting temperature, burning a fuel-air mixture with insufficient air so as to produce a second reducing flue gas at a temperature substantially above said melting temperature, cooling said second gas to a temperature substantially below said melting temperature, mixing said first and second gases to produce a third gas at a temperature to heat and hold said joint slightly below said melting temperature, directing said third gas against said joint at a velocity sufficient to provide turbulent scrubbing of said joint until said two metals and alloy are heated to a temperature slightly below said melting temperature, and raising the temperature of said third gas to a temperature above said melting temperature until said alloy flows into said joint.

3. A method of brazing a workpiece containing at least one joint to be united by brazing comprising the steps of:
   providing a stream of gas at an elevated temperature,
   supplying the stream of gas to the workpiece by directing same forcibly against the workpiece so as to create a turbulent flow of gas on the surface of the workpiece,
   withdrawing the stream of gas supplied to the workpiece through a path having at least a portion lateral to the original direction of flow of the stream of gas to cause the turbulent stream of gas to circulate about the surface of the workpiece and supply heat substantially equally to all parts of the joint to be united,
   providing a stream of gas at a temperature in excess of the aforementioned elevated temperature, and
   supplying the stream of gas at the excess temperature against the workpiece for a period of time sufficient to melt the brazing material and unite the parts defining the joint.

4. A method of brazing a workpiece subject to rapid oxidation at elevated temperatures comprising the steps of providing in an air-free atmosphere hot gas at a temperature close to the brazing temperature of filler material associated with the workpiece, passing said hot gas against the workpiece to quickly and evenly preheat the workpiece through effective scrubbing by the gas of substantially the entire portion of the workpiece being brazed, providing in an air-free atmosphere hot gas at a temperature slightly above said brazing temperature, passing the last said hot gas against said workpiece to quickly and evenly melt said filler material through effective scrubbing by the gas of substantially the entire portion of the workpiece being brazed wherein each hot gas stream is reducing flue gas and includes a high temperature gas diverted toward the workpiece combined with a stream of relatively cool flue gas surrounding the high temperature gas to retard heat loss therefrom to provide at least one resultant stream of said hot gas, and the said scrubbing of the workpiece is provided by expanding said stream as it flows against the workpiece and passing said stream of hot gas against said workpiece at sufficient velocity to cause substantial turbulence of said gas about said workpiece, and passing relatively cooler reducing flue gas against said workpiece before exposing the brazed portion of the workpiece to air to lower the temperature of the workpiece to below the rapid oxidizing temperature of the workpiece.

5. The method according to claim 4 in which the temperature of said hot gas is varied above and below said brazing temperature by varying the quantity of said high temperature gas.

References Cited

UNITED STATES PATENTS

| | | | |
|---|---|---|---|
| 2,276,847 | 3/1942 | Kelley | 29—498X |
| 2,301,812 | 11/1942 | Rentschler et al. | 29—494 |
| 2,414,511 | 1/1947 | Dyar | 29—494X |
| 2,844,867 | 7/1958 | Wernz | 29—497X |
| 3,136,032 | 6/1964 | Berndsen | 29—497X |
| 3,409,977 | 11/1968 | Johnson | 29—494 |

OTHER REFERENCES

Eldredge, "Hydrogen-Oxygen Vertical Brazing Furnace," The Review of Scientific Instruments, vol. 36, No. 8, p. 1207, August 1965.

Peck, "Which Atmosphere For Heat-Treating and Brazing?", American Machinist, Jan. 13, 1949, pp. 90–94.

JOHN F. CAMPBELL, Primary Examiner

R. J. SHORE, Assistant Examiner

U.S. Cl. X.R.

29—497, 498